ic Office 2,828,285
Patented Mar. 25, 1958

2,828,285

AMINE-MODIFIED THERMOPLASTIC PHENOL-ALDEHYDE RESINS, AND METHOD OF MAKING SAME

Melvin De Groote, St. Louis, Mo., assignor to Petrolite Corporation, Wilmington, Del., a corporation of Delaware No Drawing. Original application October 2, 1953, Serial No. 383,928. Divided and this application December 6, 1956, Serial No. 626,615

9 Claims. (Cl. 260—53)

Attention is directed to my co-pending applications, Serial Numbers 288,742, through 288,746, inclusive, filed May 19, 1952, now abandoned, and a division of my co-pending application Serial No. 383,928, filed October 2, 1953, Patent No. 2,792,366. The first of said co-pending applications is directed to a process for breaking petroleum emulsions employing a demulsifier including products obtained by condensing certain phenol-aldehyde resins, therein described in detail, with certain basic non-hydroxylated secondary monoamines, also therein described in detail, and formaldehyde.

The second application is similar to the first except that the monoamines employed as reactants are hydroxylated instead of being nonhydroxylated. The third application is similar to the first one insofar that nonhydroxylated polyamines are employed as reactants. The fourth application is concerned with hydroxylated polyamines as reactants and the last application is concerned with amines having a cyclic amidine group in the reactant regardless of whether it is hydroxylated or not.

The present application is differentiated from the aforementioned five applications in that the aldehyde used, instead of being formaldehyde, is glyoxal. Stated another way, this invention is concerned with certain heat-stable oxyalkylation-susceptible resinous condensation products obtained by condensing certain phenol-aldehyde resins, hereinafter described in detail, with certain basic secondary amines, also hereinafter described in detail, and glyoxal.

For purpose of illustration it may be simpler to divert momentarily to the products described in the five aforementioned co-pending applications, Serial Nos. 288,742 through and including 288,746, inclusive, and for sake of simplicity to the first one, i. e., Serial No. 288,742, in which the amine reactant is a nonhydroxylated monoamine. For purpose of simplicity the invention described in said co-pending application, Serial No. 288,742, may be exemplified by an idealized formula, as follows:

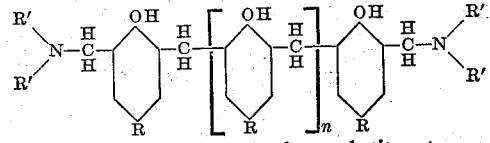

in which R represents a hydrocarbon substituent generally having 4 and not over 18 carbon atoms but most preferably not over 14 carbon atoms, and $n$ generally is a small whole number varying from 1 to 4. In the resin structure it is shown as being derived from formaldehyde although obviously other aldehydes are equally satisfactory. The amine residue in the above structure is derived from a basic amine, and usually a strongly basic amine, and may be indicated thus:

in which R' represents any appropriate hydrocarbon radical, such as an alkyl, alicyclic, arylalkyl radical, etc., free from hydroxyl radicals. The only limitation is that the radical should not be a negative radical, which considerably reduces the basicity of the amine, such as an aryl radical or an acyl radical. Needless to say, the two occurrences of R' may jointly represent a single divalent radical instead of two monovalent radicals. This is illustrated by morpholine and piperidine. The introduction of two such amino radicals into a comparatively small resin molecule, for instance, one having 3 to 6 phenolic nuclei as specified, alters the resultant product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect.

Such condensates, i. e., the condensates of Serial No. 288,742, and in fact the instant condensates, are obtained from phenol-aldehyde resins. It is well known that one can readily purchase on the open market, or prepare fusible, organic solvent-soluble, water-insoluble resin polymers of a composition approximated in an idealized form by the formula:

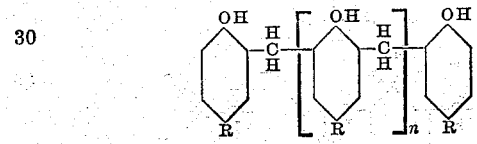

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents a hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

When a phenol-aldehyde resin amine condensate is prepared using glyoxal instead of formaldehyde, particularly if molecular equivalents are employed, that is, one mole of glyoxal to replace 2 moles of formaldehyde, it becomes apparent that certain other modifications can and do take place with the result that one obtains a molecule having a different structure and in many instances a comparatively higher molecular weight. All that is necessary is to reconsider the condensate in terms of the over-simplified structure previously noted, to wit:

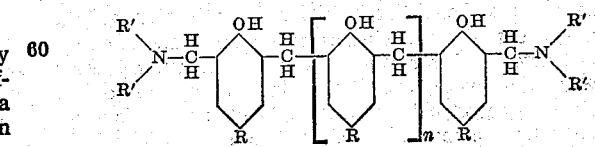

For convenience, this formula can be abbreviated somewhat, thus:

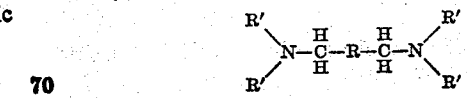

If glyoxal is used it is apparent an entirely different structure is obtainable. This structure, at least an inner segment thereof, can be shown thus:

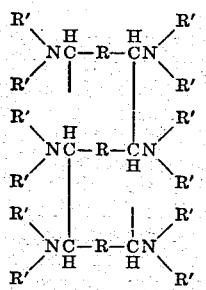

Reverting again to what is said in the five co-pending applications previously referred to, and particularly to Serial No. 288,742, reference is made to the text which describes other products of reaction which appear in the co-generic mixture resulting from reaction between the resin, the secondary amine and formaldehyde. The reference is as follows:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

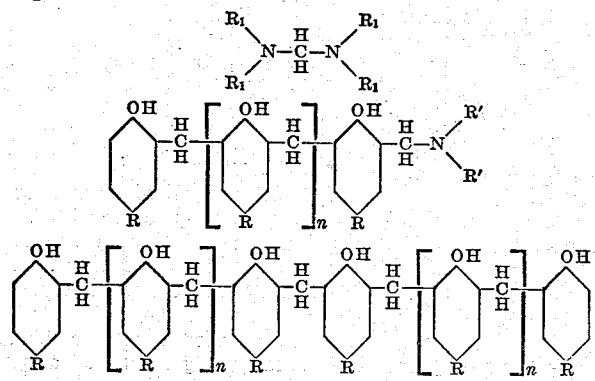

When formaldehyde is replaced by glyoxal, in light of what has been said it becomes apparent that the three above formulas could be written showing dimeric or trimeric forms of each structure rather than the monomer. Over and above this combinations could take place between any one of the three above or any one of the three with the condensate previously depicted.

In any event, to the extent that in a reaction mass formaldehyde is replaced by glyoxal it becomes apparent that a more complicated and an entirely different structure, or structures, are obtainable. In many instances where formaldehyde gives a condensate which is a highly viscous liquid the use of glyoxal results in a solid. Furthermore, the molecular weight to the extent that its determination can be made or approximations can be made, seem to be distinctly higher in molecular weight. In any event, the condensates so obtained are different in character and for some purposes particularly after oxyalkylation with ethylene oxide, propylene oxide, butylene oxide, glycide, or methylglycide are particularly effective for the resolution of petroleum emulsions. Indeed, in many instances the oxyalkylation derivatives are distinctly more effective than the comparable products derived from condensates in which formaldehyde is used.

For purposes of convenience what is said hereinafter will be divided into five parts:

Part 1 is concerned with phenol-aldehyde resins suitable for condensation;

Part 2 is concerned with suitable secondary amines which can be employed in conjunction with the resins in the condensation procedure;

Part 3 is concerned with the condensation procedure as such;

Part 4 is concerned with the uses of the condensates for the resolution of petroleum emulsions, and Part 5 is concerned with uses for the condensates for purposes other than demulsification, and particularly for their use as initial raw materials which are subjected to oxyalkylation.

PART 1

This part is concerned with the preparation of phenol-aldehyde resins of the kind described in detail in U. S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. patents: Nos. 2,499,365, 2,499,366, and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atoms also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

Reference has been made to an earlier formula which was in essence an over-simplification representing a phenolformaldehyde resin. Actually, some other aldehyde, such as acetaldehyde, propionaldehyde, or butyraldehyde, may be used. The resin unit can be exemplified thus:

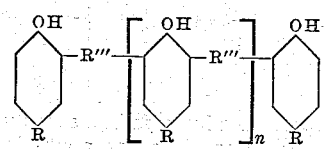

in which R''' is the divalent radical obtained from the particular aldehyde employed to form the resin.

As previously stated, the preparation of resins of the kind herein employed as reactants is well known. See U. S. Patent No. 2,499,368, dated March 7, 1950, to De Groote and Keiser. Resins can be made using an acid catalyst or basic catalyst or a catalyst showing neither acid nor basic properties in the ordinary sense, or without any catalyst at all. It is preferable that the resins employed be substantially neutral. In other words, if prepared by using a strong acid as a catalyst, such strong acid should be neutralized. Similarly, if a strong base is used as a catalyst, such strong acid should be neutralized. Similarly, if a strong base is used as a catalyst it is preferable that the base be neutralized although we have found that sometimes the reaction described proceeded more rapidly in the presence of a small amount of free base. The amount may be as small as a 200th of a percent and as much as a few tenths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purpose of convenience suitable resins are characterized in the following table:

TABLE I

| Example number | R | Position of R | R''' derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 2

As noted previously, a variety of secondary amines free from a primary amino group may be employed. These amines fall into five categories, as indicated previously.

One category consists of strongly basic secondary monoamines free from hydroxyl groups whose composition may be indicated thus:

in which R' represents a monovalent alkyl, alicyclic, arylalkyl radical and may be heterocyclic in a few instances as in the case of piperidine and a secondary amine derived from furfurylamine by methylation or ethylation, or a similar procedure.

Another example of a heterocyclic amine is, of course, morpholine.

The secondary amines most readily available are, of course, amines such as dimethylamine, methylethylamine, diethylamine, dipropylamine, ethylpropylamine, dibutylamine, diamylamine, dihexylamine, dioctylamine, and dinonylamine. Other amines include bis(1,3-dimethylbutyl)amine. There are, of course, a variety of primary amines which can be reacted with an alkylating agent such as dimethyl sulfate, diethyl sulfate, an alkyl bromide, an ester of sulfonic acid, etc., to produce suitable amines within the herein specified limitations. For example, one can methylate alpha-methylbenzylamine, or benzylamine itself, to produce a suitable reactant. Needless to say, one can use secondary amines such as dicyclohexylamine, dibutylamine or amines containing one cyclohexyl group and one alkyl group, or one benzyl group and one alkyl group, such as ethylcyclohexylamine, ethylbenzylamine, etc.

Other suitable compounds are exemplified by $(C_2H_5OC_2H_4OC_2H_4)_2NH$
$(C_8H_{17}OC_2H_4OC_2H_4OC_2H_4)_2NH$
$(C_4H_9OCH_2CH(CH_3)O(CH_3)CHCH_2)_2NH$
$(CH_3OCH_2CH_2OCH_2CH_2OCH_2CH_2)_2NH$
$(CH_3OCH_2CH_2CH_2CH_2CH_2CH_2)_2NH$ Other somewhat similar secondary amines are those of the composition

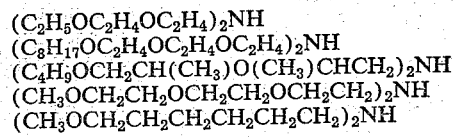

as described in U. S. Patent No. 2,375,659, dated May 8, 1945, to Jones et al. In the above formula R may be methyl, ethyl, propyl, amyl, octyl, etc.

Other amines can be obtained from products which are sold in the open market, such as may be obtained by alkylation of cyclohexylmethylamine or the alkylation of similar primary amines, or, for that matter, amines of the kind described in U. S. Patent No. 2,482,546, dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and beta-phenoxypropylamine.

Other suitable amines are the kind described in British Patent No. 456,517 and may be illustrated by

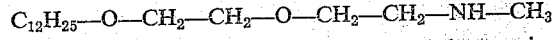

The secondary category represents secondary amines which are hydroxylated monoamines. These may be illustrated by diethanolamine, methylethanolamine, dipropanolamine, dibutanolamine and ethylpropanolamine. Suitable primary amines which can be so converted into secondary amines include butylamine, amylamine, hexylamine, higher molecular weight amines derived from fatty acids, cyclohexylamine, benzylamine, furfurylamine, etc.

Other suitable amines include 2-amino-1-butanol, 2-amino - 2-methyl-1-propanol, 2-amino-2-methyl-1,3-propanediol, 2-amino-2-ethyl-1,3-propanediol, and tris-(hydroxylmethyl)aminoethane. Another example of such amines is illustrated by 4-amino-4-methyl-2-pentanol.

Other suitable compounds are the following:

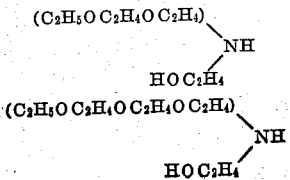

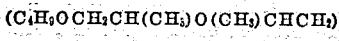
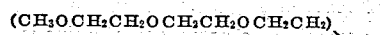

or comparable compounds having two hydroxylated groups of different lengths as in

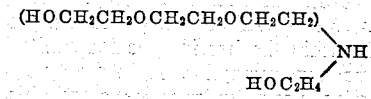

Other examples of suitable amines include alpha-methylbenzylamine and monoethanolamine; also amines obtained by treating cyclohexylmethylamine with one mole of an oxyalkylating agent as previously described; beta-ethylhexylbutanolamine, diglycerylamine, etc. Another type of amine which is of particular interest because it includes a very definite hydrophile group includes sugar amines such as glucamine, galactamine and fructamine, such as N-hydroxyethylglucamine, N-hydroxyethylgalactamine, and N-hydroxyethylfructamine.

Other suitable amines may be illustrated by

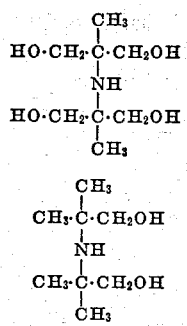

See also, corresponding hydroxylated amines which can be obtained from rosin or similar raw materials and described in U. S. Patent No. 2,510,063, dated June 6, 1950, to Bried. Still other examples are illustrated by treatment of certain secondary amines, such as the following, with a mole of an oxyalkylating agent as described; phenoxyethylamine, phenoxypropylamine, phenoxyalphamethylethylamine, and phenoxypropylamine.

Polyamines free from a hydroxyl group may be illustrated by the following:

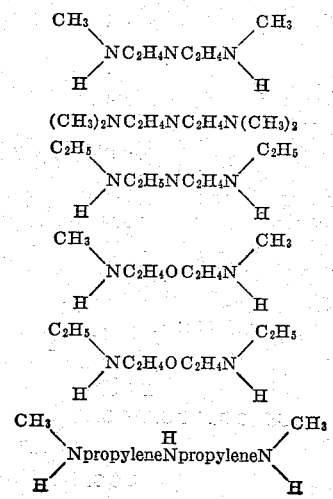

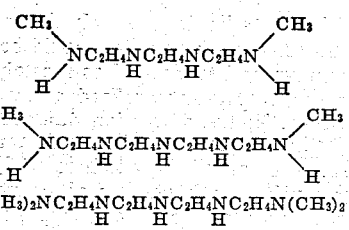

The fourth category consists of polyamines having hydroxylated groups which may be characterized by the following:

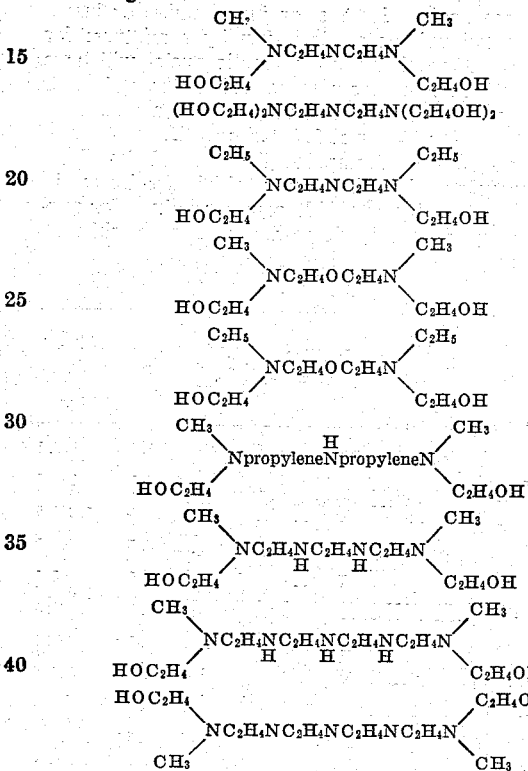

Suitable cyclic amidines which may or may not have a hydroxyl group but are free from primary amino groups may be illustrated by the following:

2-undecylimidazoline
2-heptadecylimidazoline
2-oleylimidazoline
1-N-decylaminoethyl,2-ethylimidazoline
2-methyl,1-hexadecylaminoethylaminoethylimidazoline
1-dodecylaminopropylimidazoline
1-(stearoyloxethyl)aminoethylimidazoline
1-stearamidoethylaminoethylimidazoline
1-(N-dodecyl)-acetamidoethylaminoethylimidazoline
2-heptadecyl,4,5-dimethylimidazoline
1-dodecylaminohexylimidazoline
1-stearoyloxyethylaminohexylimidazoline
2-heptadecyl,1-methylaminoethyl tetrahydropyrimidine
4-methyl,2-dodecyl,1-methylaminoethylaminoethyl tetrahydropyrimidine A compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

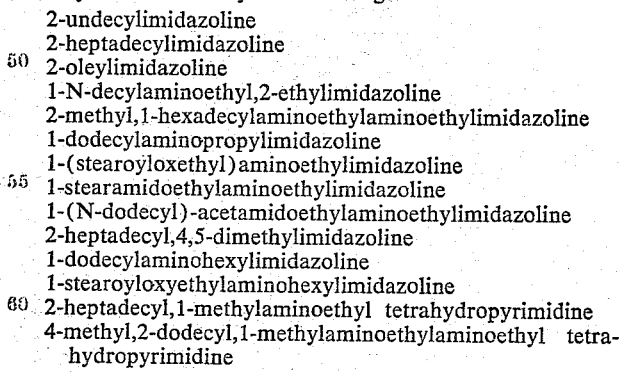

2-heptadecyl, 1-aminoethylimidazoline which can be reacted with a single mole of ethylene oxide, for example, to produce the hydroxy ethyl derivative of 2-heptadecyl,1-aminoethylimidazoline, which can be illustrated by the following formula:

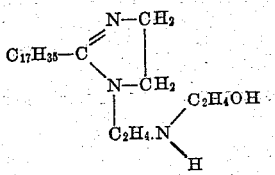

Other reactants may be employed in connection with an initial reactant of the kind described above, to wit, 2-heptadecyl,1-aminoethylimidazoline; for instance, reaction with an alkylene imine such as ethylene imine, propylene imine, etc. If reacted with ethylene imine the net result is to convert a primary amino radical into a secondary amino radical and also to introduce a new primary amine group. If ethylene imine is employed, the net result is simply to convert 2-heptadecyl, 1-aminoethylimidazoline into 2-heptadecyl, 1-diethylenediaminoimidazoline. However, if propylene imine is used the net result is a compound which can be considered as being derived hypothetically from a mixed polyalkylene amine, i. e., one having both ethylene groups and a propylene group between nitrogen atoms.

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

The herein described amine-modified resins are obtained from glyoxal and not formaldehyde. Generally speaking, the objective in the preparation of these amine-modified resins is to obtain a heat-convertible compound even by using formaldehyde. It is not necessary to point out the complications involved when glyoxal is used. See, for example, U. S. Patent No. 2,031,557 to Bruson. Since the condensation products obtained are not heat-convertible and since a temperature up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent as noted, and it is not necessary to have a single phase system for reaction.

Glyoxal is available as a 30% aqueous solution. In this way it is comparable to formaldehyde which is available as a 37% aqueous solution, and is sometimes used in more dilute form. I have found no difficulty in promoting the condensation reaction although at times it is desirable to add some solvent having a common solvent effect. Thus an oxygenated solvent may or may not be employed. Such solvent may be employed in combination with a hydrocarbon solvent such as xylene. However, if the reaction mass is going to be subjected to some further reaction where the solvent may be objectionable as in the case of ethyl or hexyl alcohol, and if there is to be subsequent oxyalkylation, then, obviously, the alcohols should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the condensation products obtained are invariably dark and particularly reddish or dark red in color.

By and large, the melting point of the condensate is apt to be higher than of comparable condensates obtained by the use of formaldehyde or furfural. As has been suggested previously, this apparently is due to the difunctional property of glyoxal. Indeed, depending on the resin selected and the amine selected the condensate product or reaction mass on a solvent-free basis is apt to be harder than the original resin itself. This is particularly true when all the amino hydrogen atoms present in the amine have entered into reaction.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxy-acetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been mentioned previously; (a) is the solvent to remain in the reaction mass without removal? (b) is the reaction mass to be subjected to further reaction in which the solvent, for instance, an alcohol, either low boiling or high boiling, might interfere as in the case of oxyalkylation? and the third factor is this (c) is an effort to be made to purify the reaction mass by the usual procedure as, for example, a water-wash to remove any unreacted low molal soluble amine, if employed and present after reaction? Such procedures are well known and, needless to say, certain solvents are more suitable than others. Everything else being equal, I have found xylene the most satisfactory solvent.

I have found no advantage in using a low temperature, approximately room temperature, at the start of the reaction although this is sometimes done purely as a matter of convenience. Indeed, using furfural I have usually done nothing more than prepare the reaction mixture, add a suitable amount of xylene, and reflux for approximately 3 to 6½ hours at temperatures varying, as the case may be, from 135° to 160° C. Where the amine has a comparatively low basicity I have sometimes added a small amount or approximately 1% of sodium methylate.

However, using a xylene-benzene mixture, for instance, approximately 170 parts of benzene and 35 parts of xylene, and a phase-separating trap to eliminate water, I have found that I could employ temperatures between 90° and 100° C., and eliminate the water of condensation by refluxing at this temperature. However, I have found no particular advantage in using this low temperature over and above the high temperature previously noted.

Example 1b

The resin employed was the one previously designated as 28a and had a molecular weight of approximately 600. 175 grams of this resin were dissolved in an equal weight of xylene and 61 grams of di-isopropanolamine added. 58 grams of glyoxal (30% aqueous solution) were added and the mixture stirred for about 30 minutes and then the temperature allowed to rise to 140° C., where it was allowed to reflux for 6 hours. During this refluxing period a phase-separating trap was used to remove the water of formation. At the end of this time the reaction was complete and the product was obtained in the form of a xylene solution. A small sample was evaporated to eliminate the xylene. The resultant product was a highly viscous, tacky material, being black in color with a reddish tinge.

Similar products were prepared as indicated in the following table.

TABLE II

| Ex. No. | Resin amt., grams | Secondary amine | Amt., grams | Glyoxal (30% aq. sol.) grams | Solvent (xylene unless otherwise noted), grams | Time period, hrs. | Max. temp. during reaction, °C. |
|---|---|---|---|---|---|---|---|
| 1b | 175 | Di-isopropylamine | 61 | 58 | 170 | 7 | 145 |
| 2b | 150 | Di-n-butylamine | 65 | 48 | 160 | 6 | 160 |
| 3b | 150 | Di-ethylamine | 37 | 48 | 155 | 5 | 143 |
| 4b | 150 | Di-cyclohexylamine | 91 | 48 | 155 | 7 | 170 |
| 5b | 300 | Morpholine | 87 | 96 | 305 | 6 | 145 |
| 6b | 300 | Di-2-ethylhexylamine | 241 | 96 | 290 | 4.5 | 163 |
| 7b | 225 | Bis-(1,3-dimethyl-butyl)amine | 139 | 72 | 235 | | |
| 8b | 225 | Di-isopropanolamine | 100 | 72 | 230 | 3 | 160 |
| 9b | 225 | a-Methylbenzyl-ethanolamine | 124 | 72 | 235 | 3 | 157 |
| 10b | 225 | Di-ethanolamine | 79 | 72 | 220 | 2.5 | 158 |
| 11b | 225 | Aminoethyl ethanolamine | 78 | 72 | 230 | 2 | 140 |
| 12b | 225 | Diethanolamine | 79 | 72 | **55-170 | 3 | 100 |
| 13b | 225 | Diethanolamine | 79 | 72 | **55-170 | 3 | 98 |
| 14b | 225 | Diethanolamine | 131.5 | 128 | **55-170 | 3 | 99 |
| 15b | 225 | Diisopropanolamine | 174 | 128 | 235 | 1.75 | 130 |
| 16b | 236 | Di-isopropanolamine | 61 | 58 | 231 | 7 | 145 |
| 17b | 197 | Di-n-butylamine | 65 | 48 | 192 | 6 | 160 |
| 18b | 197 | Di-ethylamine | 37 | 48 | 203 | 5 | 145 |
| 19b | 197 | Di-cyclohexylamine | 91 | 48 | 185 | 7 | 165 |
| 20b | 393 | Morpholine | 87 | 96 | 384 | 6.5 | 155 |
| 21b | 393 | Di-(2-ethylhexyl)amine | 241 | 96 | 398 | 5.0 | 170 |
| 22b | 197 | N-methylaniline | 54 | 48 | 102 | 4 | 170 |
| 23b | 295 | Di-(beta-phenylethyl)amine | 169 | 72 | 300 | 4.5 | 160 |
| 24b | 295 | Di-isopropanolamine | 100 | 72 | 200 | 3 | 155 |
| 25b | 225 | Di-ethanolamine | 79 | 72 | 305 | 2.75 | 158 |
| 26b | 188 | Di-isopropylamine | 61 | 58 | 220 | 8 | 145 |
| 27b | 188 | Di-n-butylamine | 65 | 48 | 178 | 5 | 162 |
| 28b | 188 | Di-ethylamine | 37 | 48 | 180 | 6 | 145 |
| 29b | 374 | Di-cyclohexylamine | 91 | 48 | 196 | 7 | 163 |
| 30b | 374 | Morpholine | 87 | 96 | 370 | 6.5 | 155 |
| 31b | 188 | Di-(2-ethylhexyl)amine | 241 | 96 | 378 | 4.5 | 168 |
| 32b | 280 | N-methylaniline | 54 | 48 | 198 | 5 | 170 |
| 33b | 280 | Di-(beta-phenylethyl)amine | 169 | 72 | 290 | 4.5 | 158 |
| 34b | 280 | Di-isopropanolamine | 100 | 72 | 270 | 3 | 155 |
| 35b | 280 | Di-ethanolamine | 79 | 72 | 270 | 2.75 | 158 |

NOTE.—In the above examples no catalyst was added. In some duplications of the above small amounts of catalyst were added up to 1% to 2% of either powdered caustic soda or powdered sodium methylate. No advantage was noted in the use of a catalyst provided the amine was sufficiently basic.

In Examples 12b, 13b and 14b indicated by the double asterisk the solvent was a mixture of 170 parts of benzene and 55 parts of xylene.

The molal ratio of resin to amine to aldehyde was 1 to 2 to 1, except in Examples 14b and 15b where the ratio was 1 to 3.5 to 1.75 in both instances.

In Examples 1b through 15b the resin employed was the one identified as Example 28a. In Examples 16b through 25b the resin employed was the one identified as Example 32a, and in Examples 26b through 35b the resin employed was identified as Example 39a.

Returning now to a consideration of the structure of the condensate it becomes obvious that one could obtain ring compounds. Using the abbreviated formula previously applied, the simplest ring could be shown thus:

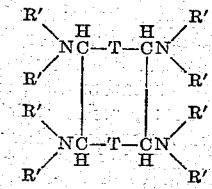

Obviously, one could have rings with a large number of members in the ring to say nothing of complications involving alkanol radicals, for instance, the elimination of a hydrogen atom from the alkanol hydroxyl group. Furthermore, the situation becomes even more complicated if the ratios are changed to correspond to ratios described in my co-pending application, Serial No. 376,240, filed August 24, 1953. In this particular instance there are described a number of complicated condensates in which 3½ moles of diethanolamine, or the like, 3½ moles of formaldehyde, and one mole of the phenol-aldehyde resin, are employed. If corresponding condensates are prepared, replacing 3½ moles of formaldehyde by 1¾ moles of glyoxal, a variety of compounds are obtained which have unusual structure but are still organic solvent-soluble and susceptible to oxyalkylation. Indeed, another variety of somewhat more complicated materials are obtained by using as the amine reactant di(hydroxyethyl)N,N'-ethylene diamine having the following structure:

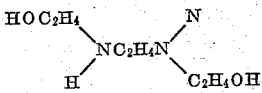

An initial product can be made treating the amine as if it were nothing more than a hydroxylated monoamine. Subsequently glyoxal may be added up to, for example, the amount originally employed with the production of linear polymers and in some instances cross-linking. It is understood that regardless of what amine is used the final product obviously is, and must be, organic solvent-soluble. The primary objective is to obtain a condensate which is organic solvent-soluble and not an infusible resin. Such condensate is particularly valuable for oxyalkylation. The products so obtained find utility in various arts.

PART 4

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 8b, herein described.

PART 5

The products described in Part 4 have utility in at least two distinct ways—the products as such, or in the form of some simple derivative, such as the salt which can be used in numerous arts subsequently described. Also, the products can serve as initial materials for more complicated reactions of the kind previously mentioned, to wit, they may be subjected to oxyalkylation, particularly oxyethylation, or oxypropylation or oxybutylation to give products which are not only valuable for the purpose described in regard to the parent material or the salts of the parent material, but also for other purposes. Likewise, since the tertiary amino nitrogen atom is present the products can readily be reacted with suitable reactants such as chloroacetic acid esters, benzyl chloride, alkyl halides, esters of sulfonic acids, methyl sulfate, or the like, to give quaternary ammonium compounds which are used, not only for the purposes herein described, but also for various other uses.

In such instances where the amine contains a hydroxyl group the product is susceptible to reactions involving the hydroxyl radical, particularly acylation reactions, etc., i. e., reactions involving the use of either monocarboxy acids which may be low molal or high molal, and polycarboxy acids of the kind previously enumerated.

The products herein described as such and prepared in accordance with this invention can be used as emulsifying agents, for oils, fats and waxes, as ingredients in insecticides compositions, or as detergents and wetting agents in the laundering, scouring, dyeing, tanning and mordanting industries. They also may be used for preparing boring or metal-cutting oils and cattle dips, as metal pickling inhibitors, and for pharmaceutical purposes.

Other uses include the preparation or resolution of petroleum emulsions, whether of the water-in-oil type or oil-in-water type. They may be used as additives in connection with other emulsifying agents; they may be employed to contribute hydrotropic effects; they may be used as anti-strippers in connection with asphalts. They may be used to prevent corrosion, particularly the corrosion of ferrous metals for various purposes and particularly in connection with the production of oil and gas, and also in refineries where crude oil is converted into various commercial products. The products may be used industrially to inhibit or stop microorganic growth or other objectionable lower forms of life, such as the growth of algae, or the like; they may be used to inhibit the growth of bacteria, molds, etc.; they are valuable additives to lubricating oils, both those derived from petroleum and synthetic lubricating oils, and also to hydraulic brake fluids of the aqueous or nonaqueous type. Some have definite anti-corrosive action. They may be used in connection with other processes where they are injected into an oil or gas well for the purpose of removing a mud sheath, increasing the ultimate flow or fluid from the surrounding strata, and particularly in the secondary recovery operations using aqueous flood waters. They may be used also in dry cleaners' soaps.

With regard to the above statements, reference is made particularly to the use of the materials as such, or in the form of a salt; the salt form refers to a salt involving either one or both basic nitrogen atoms. Obviously, the salt form involves a modification in which the hydrophile character can either be increased or decreased and, inversely, the hydrophobe character can be decreased or increased. For example, neutralizing the product with practically any low molal acid, such as acetic acid, hydroxy acetic acid, lactic acid, or nitric acid, is apt to markedly increase the hydrophile effect. One may also use acids of the type

in which R is a comparatively small alkyl radical, such as methyl, ethyl or propyl. The hydrophile effect may be decreased and the hydrophobe effect increased by neutralizing with a monocarboxy detergent-forming acid. These are acids which have at least 8 and not more than 32 carbon atoms. They are obtained from higher fatty acids and include also resin acids such as abietic acid, and petroleum acids such as naphthenic acids and acids obtained by the oxidation of wax. One can also obtain new products having unique properties by combination with polybasic acids, such as diglycolic acid, oxalic acid, dimerized acids from linseed oil, etc. The most common examples, of course, are the higher fatty acids having generally 10 to 18 carbon atoms. I have found that a particularly valuable anti-corrosive agent can be obtained from any suitable resin and formaldehyde provided the secondary amine is hydroxyethyl cyclohexylamine. The corrosion inhibiting properties of this compound can be increased by neutralization with either one or two moles of an oil-soluble sulfonic acid, particularly a sulfonic acid of the type known as mahogany sulfonic acid.

I have found the products herein described are of unusual utility for preventing the separation of sludge in fuel oil during storage.

Having thus described my invention, what I claim as new and desire to secure by Letters Patent is:

1. The process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

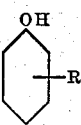

in which R is an aliphatic hydrocarbon radical having at least 4 and not more than 24 carbon atoms and substituted in the 2,4,6 position; (b) a basic secondary amine free from any primary amino radical and having not more than 32 carbon atoms in any group attached to any amino nitrogen radical and reactive towards glyoxal; and (c) glyoxal; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible.

2. The process of claim 1 with the proviso that there be an alkanol radical attached to at least one amino nitrogen atom.

3. The process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

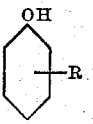

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards glyoxal; and (c) glyoxal; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a glyoxal-derived substituted methylene bridge connecting the amino nitrogen atom with a resin molecule; with the further proviso that the ratio of reactants be approximately 1, 2 and 1 respectively; and with the final proviso that the resinous condensation product resulting from the process be heat-stable and oxyalkylation-susceptible.

4. The process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

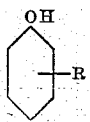

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards glyoxal; and (c) glyoxal said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a glyoxal-derived substituted methylene bridge connecting the amino nitrogen atom with a resin molecule; with the added proviso that the ratio of reactants be approximately 1, 2 and 1, respectively, with the further proviso that said procedure involve the use of a solvent; and with the final proviso that the resinous condensation product resulting from the process be heat-stable and oxyalkylation-susceptible.

5. The process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being derived by reaction between a difunctional monohydric phenol and formaldehyde; said resin being formed in the substantial absence of phenols of functionality greater than 2; said phenol being of the formula

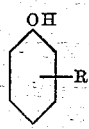

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards glyoxal; and (c) glyoxal said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a glyoxal-derived substituted methylene bridge connecting the amino nitrogen atom with a resin molecule; with the added proviso that the ratio of reactants be approximately 1, 2 and 1, respectively; with the further proviso that said procedure involve the use of a solvent; and with the final proviso that the resinous condensation product resulting from the process be heat-stable and oxyalkylation-susceptible.

6. The process of condensing (a) an oxyethylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being derived by reaction between a difunctional monohydric phenol and formaldehyde; said resin being formed in the substantial absence of phenols of functionality greater than 2; said phenol being of the formula

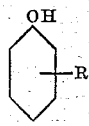

in which R is an aliphatic hydrocarbon radical having at least 4 and not more than 14 carbon atoms and substituted in the 2,4,6 position; (b) a basic hydroxylated secondary monoamine having not more than 32 carbon atoms in any group attached to the amino nitrogen atom and reactive towards glyoxal; and (c) glyoxal said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a glyoxal-derived substituted methylene bridge connecting the amino nitrogen atom with a resin molecule; with the added proviso that the ratio of reactants be approximately 1, 2 and 1, respectively; with the further proviso that said procedure involve the use of a solvent; and with the final proviso that the resinous condensation product resulting from the process be heat-stable and oxyalkylation-susceptible.

7. The product resulting from the manufacturing process defined in claim 1.

8. The product resulting from the manufacturing process defined in claim 3.

9. The product resulting from the manufacturing process defined in claim 6.

No references cited.